(12) United States Patent
Liu et al.

(10) Patent No.: US 11,807,557 B1
(45) Date of Patent: Nov. 7, 2023

(54) INTELLIGENT MANUFACTURING SYSTEM AND MANUFACTURING METHOD FOR TERAHERTZ WATER MOLECULE REARRANGEMENT

(71) Applicant: ZHONGSHAN MEILIXIN ELECTRONIC TECHNOLOGY CO., LTD., Zhongshan (CN)

(72) Inventors: Jiancong Liu, Zhongshan (CN); Ping Yu, Zhongshan (CN)

(73) Assignee: ZHONGSHAN MEILIXIN ELECTRONIC TECHNOLOGY CO., LTD., Zhongshan (CN)

( * ) Notice: Subject to any disclaimer, the term of this patent is extended or adjusted under 35 U.S.C. 154(b) by 0 days.

(21) Appl. No.: 18/319,613

(22) Filed: May 18, 2023

(30) Foreign Application Priority Data

Jul. 28, 2022 (CN) .......................... 202210896847.7

(51) Int. Cl.
| | |
|---|---|
| *C02F 1/48* | (2023.01) |
| *G01N 21/3581* | (2014.01) |
| *G01N 15/06* | (2006.01) |
| *G01N 22/00* | (2006.01) |
| *G01N 21/3577* | (2014.01) |

(52) U.S. Cl.
CPC ......... *C02F 1/484* (2013.01); *G01N 21/3581* (2013.01); *C02F 2201/48* (2013.01); *G01N 15/0656* (2013.01); *G01N 21/3577* (2013.01); *G01N 22/00* (2013.01); *G01N 2223/101* (2013.01)

(58) Field of Classification Search
CPC ............................ C02F 1/484; C02F 2201/48
See application file for complete search history.

(56) References Cited

U.S. PATENT DOCUMENTS 9,784,610 B2 * 10/2017 Uchida .............. G01N 21/3577

FOREIGN PATENT DOCUMENTS

| CN | 111747482 A | 10/2020 |
|---|---|---|
| CN | 113087278 A | 7/2021 |
| CN | 113908624 A | 1/2022 |
| CN | 114421232 A | 4/2022 |
| CN | 114570563 A | 6/2022 |
| WO | 2020135717 A1 | 7/2020 |

* cited by examiner

*Primary Examiner* — Peter Keyworth
(74) *Attorney, Agent, or Firm* — Jeenam Park

(57) ABSTRACT

Provided are an intelligent manufacturing system and manufacturing method for terahertz water molecule rearrangement, which relate to the technical field of terahertz water molecule rearrangement apparatuses. The intelligent manufacturing system includes a drive adjustment structure and an electromagnetic production structure, where the electromagnetic production structure is fixedly connected to a centre of the drive adjustment structure; the drive adjustment structure includes a stable connection component and a cooperative adjustment component, where the cooperative adjustment component is arranged at a centre of an inner end of the drive adjustment structure, and a side end of the cooperative adjustment component meshes with the stable connection component. Integrated production work can be achieved by means of structural arrangement of the drive adjustment structure and the electromagnetic production structure.

1 Claim, 11 Drawing Sheets

INTELLIGENT MANUFACTURING SYSTEM AND MANUFACTURING METHOD FOR TERAHERTZ WATER MOLECULE REARRANGEMENT

CROSS-REFERENCE TO RELATED APPLICATIONS

This application claims the benefit and priority of Chinese patent application No. 202210896847.7, filed on Jul. 28, 2022, disclosure of which is hereby incorporated by reference in its entirety.

TECHNICAL FIELD

The present invention relates to the technical field of terahertz water molecule rearrangement apparatuses, and in particular to an intelligent manufacturing system and manufacturing method for terahertz water molecule rearrangement.

BACKGROUND

An intelligent manufacturing system for terahertz water molecule rearrangement facilitates production work of water molecule rearrangement by means of structural arrangement, which is conducive to production work of low-frequency water and improves a production capacity of low-frequency water. Efficient production will be facilitated by means of assembly arrangement of the intelligent manufacturing system for terahertz water molecule rearrangement.

According to Chinese patent No. CN202010635001.9, a terahertz water molecule rearrangement device includes: a generator cover driving and adjusting structure (1) and a generator electromagnetic production structure (2), where the generator cover driving and adjusting structure (1) is connected to the generator electromagnetic production structure (2) by means of a thread, a stable ultraviolet lamp top plate frame (5) is arranged at a top of an interior of the generator cover driving and adjusting structure (1), several cold light lamp supporting and connecting block seats (6) are arranged at the top of the interior of the generator cover driving and adjusting structure (1) and located around the stable ultraviolet lamp top plate frame (5), a first glass partition electromagnetic generation mechanism (9) is arranged in the middle of the generator cover driving and adjusting structure (1), a light source control board drive fluted piece (7) is arranged on the first glass partition electromagnetic generation mechanism (9), a side surface of the generator cover driving and adjusting structure (1) is provided with a universal serial bus (USB) interface stable column plate (8), an interlayer of the generator electromagnetic production structure (2) is provided with a shelving layer cooperative adjustment component (4), a shelving hole (4-1) is provided on the shelving layer cooperative adjustment component (4), and a stable terahertz plate connection component (3) is arranged in the shelving hole (4-1). However, the patent cannot achieve integrated production work.

According to Chinese patent No. CN202010637135.4, a terahertz water molecule rearrangement method is as follows: terahertz electromagnetic waves between 0.1 nm and 10 nm are generated by terahertz, and the electromagnetic waves resonate with existing water molecule clusters with resonance time of 2.5 minutes-3.5 minutes. A resonance function is to activate the water molecule clusters that cannot be directly absorbed by a human body. Activation is to disperse the water molecule clusters and rearrange the water molecule clusters into linear chain molecules that can be directly absorbed by human cells. However, the patent is not conducive to multi-directional electromagnetic treatment work.

In view of that, an existing intelligent manufacturing system for terahertz water molecule rearrangement cannot achieve integrated production work during use, which is not conducive to integrated production treatment work. Moreover, the intelligent manufacturing system for terahertz water molecule rearrangement further has a problem with multi-directional electromagnetic treatment work. Therefore, a device is urgently needed to solve the above problem.

SUMMARY

An objective of the present invention is to provide an intelligent manufacturing system and manufacturing method for terahertz water molecule rearrangement, so as to solve the problem provided in the background art.

In order to achieve the above objective, the present invention provides the following technical solution: an intelligent manufacturing system for terahertz water molecule rearrangement includes a drive adjustment structure and an electromagnetic production structure, where the electromagnetic production structure is fixedly connected to a centre of the drive adjustment structure.

Preferably, the drive adjustment structure includes a stable connection component and a cooperative adjustment component.

Preferably, the cooperative adjustment component is arranged at a centre of an inner end of the drive adjustment structure, a side end of the cooperative adjustment component meshes with the stable connection component.

Preferably, the stable connection component includes a stable top plate frame, a supporting and connecting block seat, a drive fluted piece and a stable column plate.

Preferably, the stable top plate frame is arranged at a top of an inner end of the stable connection component, and the stable column plate is fixedly connected to a lower end of the stable top plate frame.

Preferably, the supporting and connecting block seat is fixedly connected to a side portion of the stable column plate, and the drive fluted piece is rotatably connected to a centre of the supporting and connecting block seat.

Compared with the prior art, the present invention has the beneficial effects as follows:

1. According to the present invention, the drive adjustment structure is mounted, and contact between the drive adjustment structure and water is facilitated by means of structural arrangement of the drive adjustment structure, such that a purpose of internal magnetization treatment is achieved. Integrated production work may be achieved by means of combined arrangement of the drive adjustment structure and the electromagnetic production structure, such that integrated production treatment work is facilitated. Moreover, multi-directional electromagnetic treatment work is facilitated by means of combined communication of the drive adjustment structure and the electromagnetic production structure, such that a purpose of better magnetization treatment is achieved.
2. According to the present invention, the electromagnetic production structure is mounted, and communication between the electromagnetic production structure and the outside is facilitated by means of structural arrangement of the electromagnetic production structure, such that placement work of the water is achieved; and by means of arrangement of a protective top frame and a mounting vertical plate frame, support and connection are facilitated to help a combined function of the electromagnetic production structure and facilitate cooperative fixation between the protective top frame and the mounting vertical plate frame, as well as the drive adjustment structure, such that efficient production and mounting work is achieved.

3. According to present invention, a lateral protective support and a locating and limiting guide frame are mounted, and the lateral protective support and the locating and limiting guide frame are fixedly connected to each other, such that a purpose of protecting the side portion of the electromagnetic production structure is achieved, and a purpose of better protecting inner end components of the drive adjustment structure and the electromagnetic production structure by helping to perform internal and external separation work by means of multi-directional protection work of the drive adjustment structure and the electromagnetic production structure is achieved, thereby improving an integrated cooperative production capacity.

BRIEF DESCRIPTION OF DRAWINGS

In order to describe the technical solutions in the examples of the present invention more clearly, the accompanying drawings required for describing the examples are briefly described below. Obviously, the accompanying drawings in the following description show merely some examples of the present invention, and those of ordinary skill in the art would further be able to derive other accompanying drawings from these accompanying drawings without making creative efforts.

In the figures: 1—drive adjustment structure, 2—electromagnetic production structure, 3—stable connection component, 4—cooperative adjustment component, 5—stable top plate frame, 6—supporting and connecting block seat, 7—drive fluted piece, 8—stable column plate, 9—first electromagnetic generation mechanism, 10—second electromagnetic generation mechanism, 11—terahertz plate, 12—electrical communication disc, 13—sealing communication disc, 14—protective pad ring frame, 15—connection ring shaft frame, 16—cooperative adjustment shaft sleeve, 17—driven fluted disc, 18—protective top frame, 19—mounting vertical plate frame, 20—cooperative communication pipe, 21—producing and processing pipe, 22—conduction and storage pipe, 23—lateral protective support, and 24—locating and limiting guide frame.

DETAILED DESCRIPTION

In order to make those skilled in the art better understand the solutions of the disclosure, the technical solutions of the examples of the disclosure will be clearly and completely described below with reference to the accompanying drawings of the examples of the disclosure. Apparently, the examples described are merely some examples rather than all examples of the disclosure. On the basis of the examples of the disclosure, all other examples obtained by those of ordinary skill in the art without making creative efforts should fall within the scope of protection of the disclosure.

It should be noted that the terms "first", "second", etc. in the description and claims of the disclosure and in the accompanying drawings described above, are used to distinguish similar objects, and not necessarily to describe a particular order or sequential order. It should be understood that the terms used in this way can be interchanged where appropriate, so as to conveniently describe the examples of the disclosure herein. Moreover, the terms "include", "comprise" and "have" as well as their any variations are intended to cover non-exclusive inclusion, for example, a process, a method, a system, a product or an apparatus including a series of steps or units does not need to be limited by those explicitly listed, but may include other steps or units not explicitly listed or inherent to these processes, methods, products or apparatuses.

The present invention will be further described below with reference to the accompanying drawings.

Example 1

Figure 1:
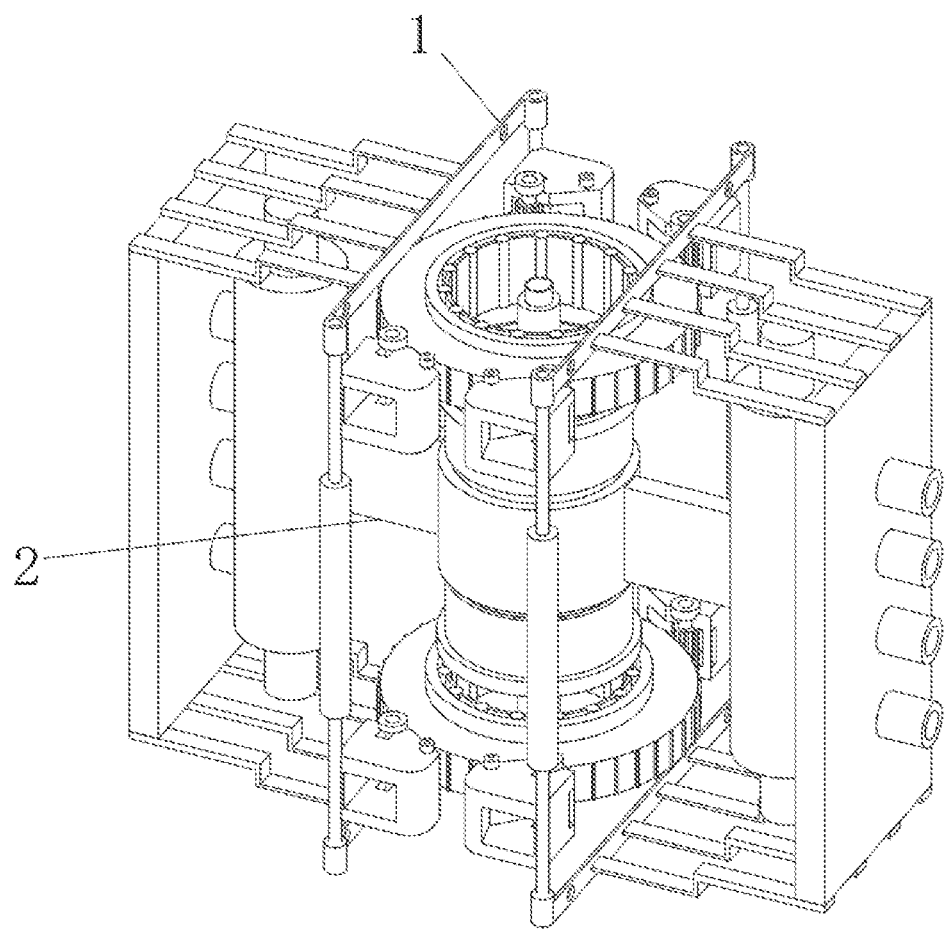
FIG. 1 is a schematic structural diagram of a main body of the present invention.
Figure 2:
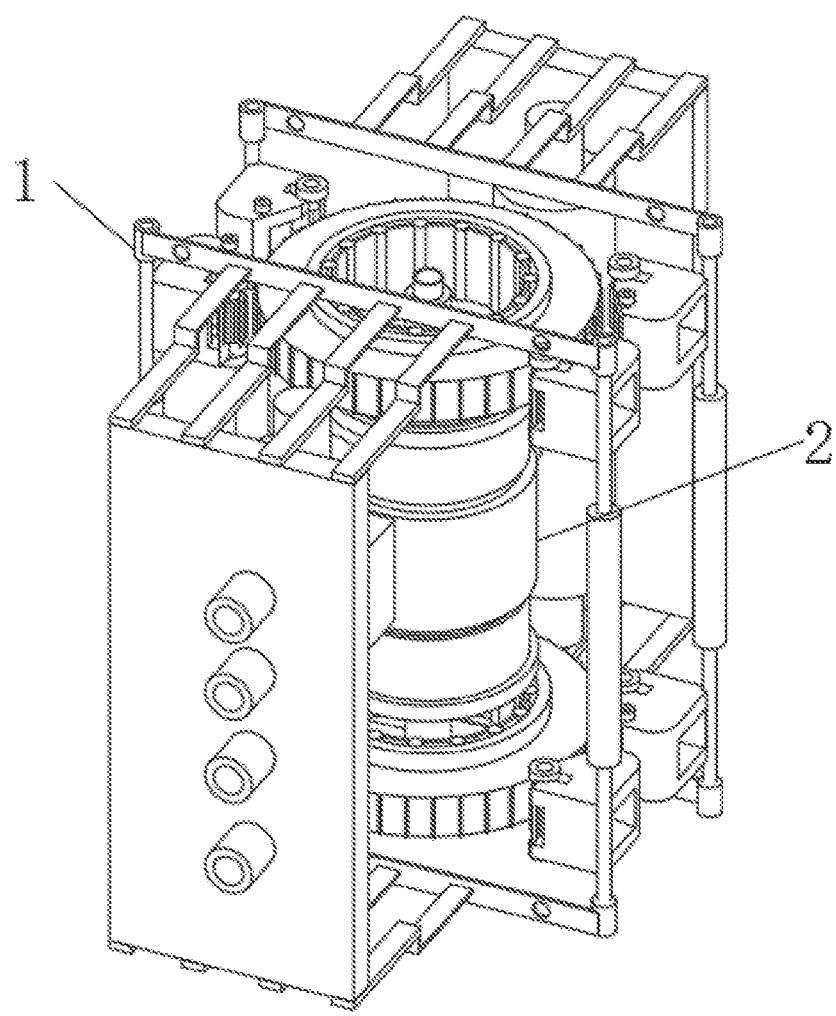
FIG. 2 is a side view of the main body of the present invention.

With reference to FIGS. 1 and 2, an intelligent manufacturing system for terahertz water molecule rearrangement of an example according to the present invention includes a drive adjustment structure 1 and an electromagnetic production structure 2, where the electromagnetic production structure 2 is fixedly connected to a centre of the drive adjustment structure 1.

Figure 3:
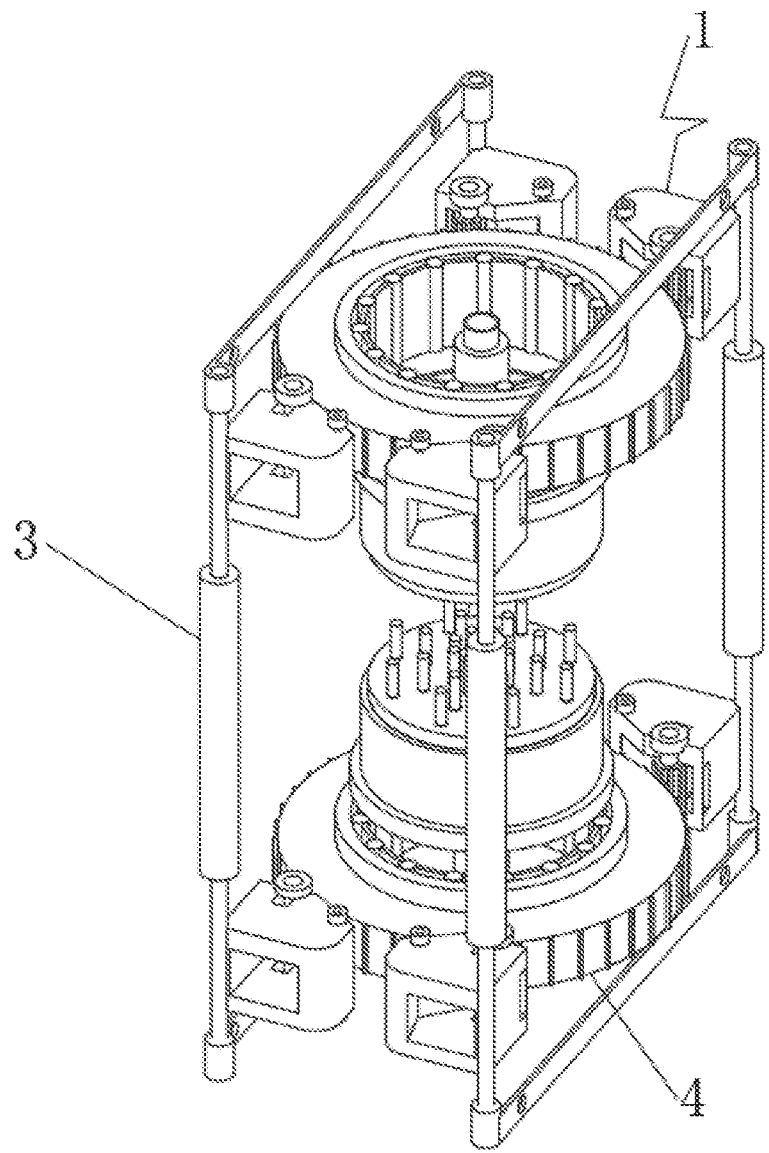
FIG. 3 is a schematic structural diagram of a drive adjustment structure of the present invention.
Figure 4:
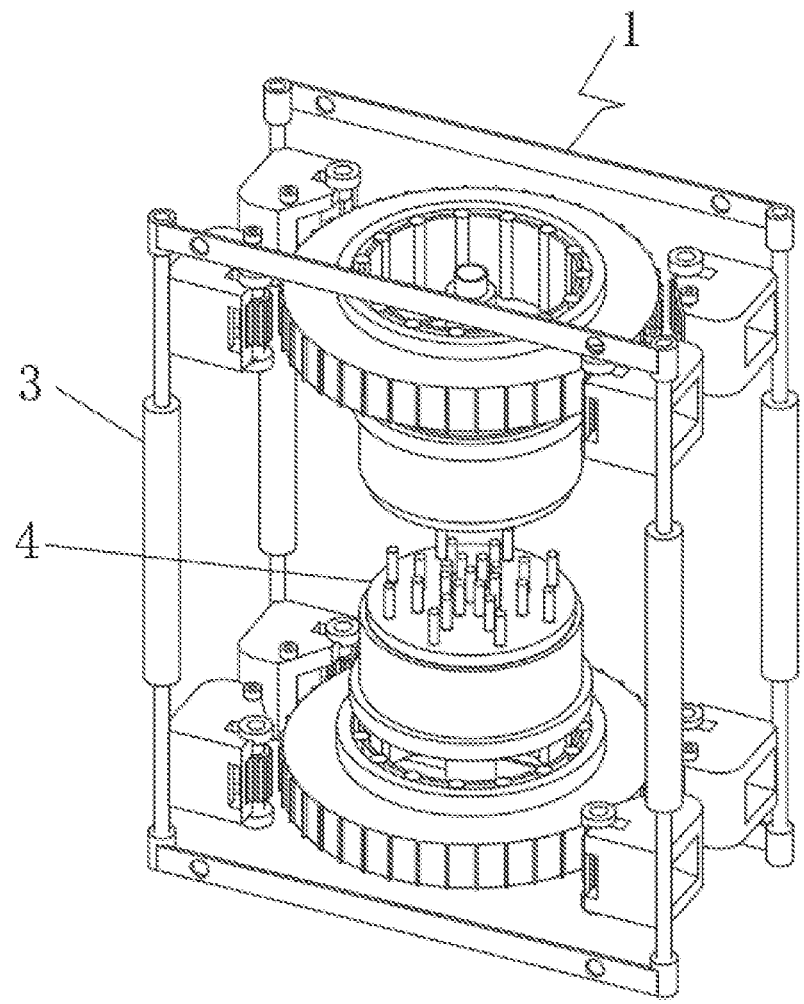
FIG. 4 is a side view of the drive adjustment structure of the present invention.

With reference to FIGS. 3 and 4, the drive adjustment structure 1 includes a stable connection component 3 and a cooperative adjustment component 4; and the cooperative adjustment component 4 is arranged at a centre of an inner end of the drive adjustment structure 1, a side end of the cooperative adjustment component 4 meshes with the stable connection component 3, and the stable connection component 3 helps to connect a side portion, so as to achieve a driving purpose of the cooperative adjustment component 4, and may drive the cooperative adjustment component 4 to be rotatably adjusted.

Figure 5:
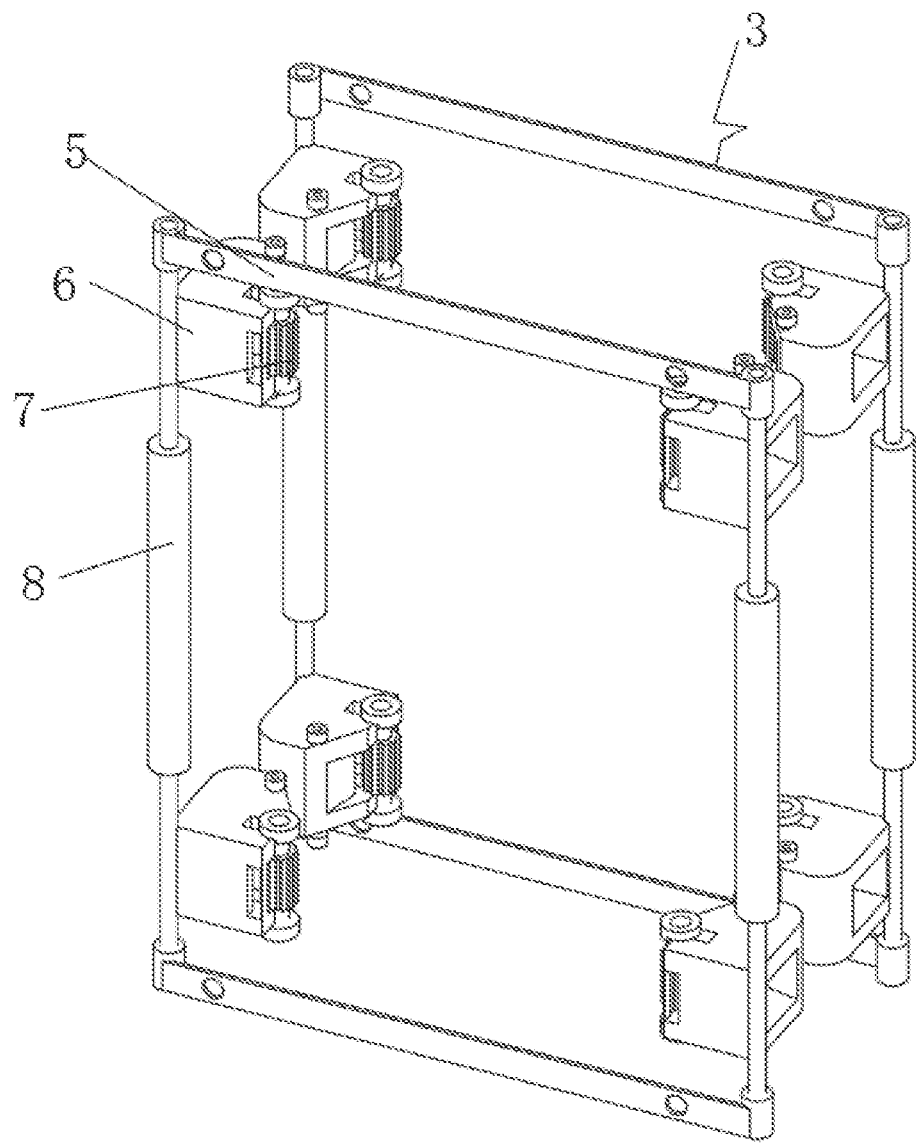
FIG. 5 is a schematic structural diagram of a stable connection component of the present invention.

With reference to FIG. 5, the stable connection component 3 includes a stable top plate frame 5, a supporting and connecting block seat 6, a drive fluted piece 7 and a stable column plate 8, where a driven fluted disc 17 meshes with the drive fluted piece 7, the driven fluted disc 17 is limited relative to the outside, an upper end of the drive fluted piece 7 is provided with a drive motor, and the drive motor drives the drive fluted piece 7 to be rotatably connected to the supporting and connecting block seat 6; and the stable top plate frame 5 is arranged at a top of an inner end of the stable connection component 3, the stable column plate 8 is fixedly connected to a lower end of the stable top plate frame 5, the supporting and connecting block seat 6 is fixedly connected to a side portion of the stable column plate 8, the drive fluted piece 7 is rotatably connected to a centre of the supporting and connecting block seat 6, the stable top plate frame 5 and the stable column plate 8 are fixed to achieve a support purpose, the supporting and connecting block seat 6 is fixed to a side end of the stable column plate 8, so as to achieve support and connection, and the drive fluted piece 7 is rotatable on the supporting and connecting block seat 6, so as to facilitate a cooperative drive function.

Figure 6:
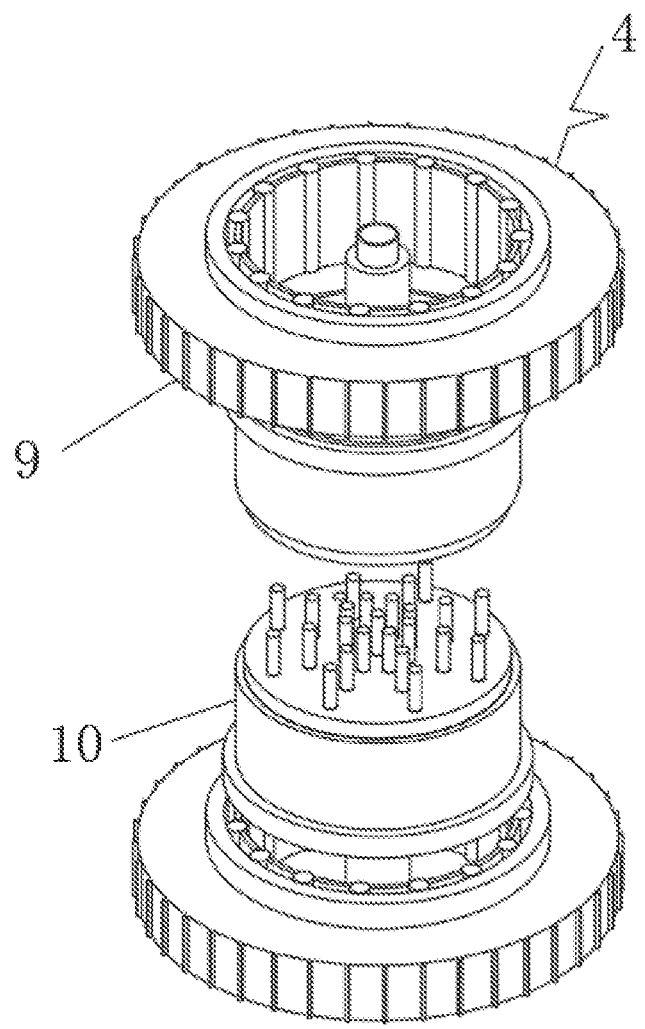
FIG. 6 is a schematic structural diagram of a cooperative adjustment component of the present invention.

With reference to FIG. 6, the cooperative adjustment component 4 includes a first electromagnetic generation mechanism 9 and a second electromagnetic generation mechanism 10; and the first electromagnetic generation mechanism 9 is arranged at a top of an inner end of the cooperative adjustment component 4, and the second electromagnetic generation mechanism 10 and the first electromagnetic generation mechanism 9 are symmetrically arranged.

Figure 7:
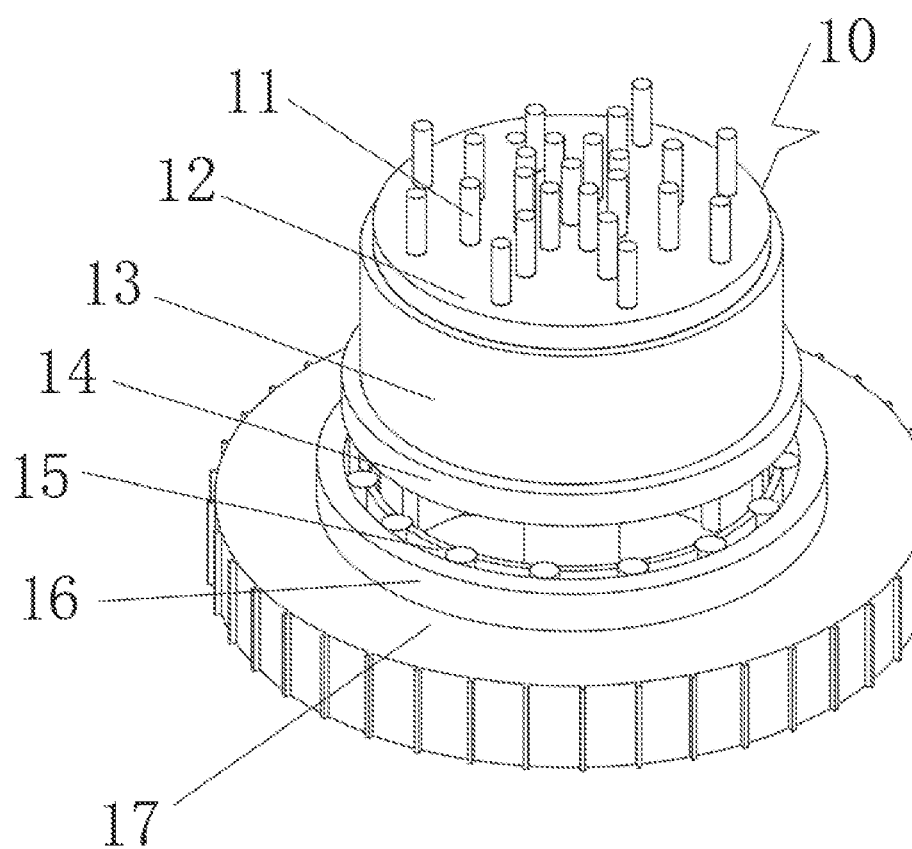
FIG. 7 is a schematic structural diagram of a second electromagnetic generation mechanism of the present invention.

With reference to FIG. 7, the second electromagnetic generation mechanism 10 includes a terahertz plate 11, an electrical communication disc 12, a sealing communication disc 13, a protective pad ring frame 14, a connection ring shaft frame 15, a cooperative adjustment shaft sleeve 16 and the driven fluted disc 17, where the plurality of terahertz plates 11 are arranged, and are all fixedly connected to an upper end of the electrical communication disc 12, the terahertz plate 11 is in electrical communication with the outside by means of the electrical communication disc 12, and the driven fluted disc 17 drives the terahertz plate 11 to be rotatably connected by means of the cooperative adjustment shaft sleeve 16, the connection ring shaft frame 15, the protective pad ring frame 14, the sealing communication disc 13 and the electrical communication disc 12; and the driven fluted disc 17 is arranged at a bottom of an inner end of the second electromagnetic generation mechanism 10, the cooperative adjustment shaft sleeve 16 is fixedly connected to an upper end of the driven fluted disc 17, the connection ring shaft frame 15 is fixedly connected to an upper end of the cooperative adjustment shaft sleeve 16, the protective pad ring frame 14 is fixedly connected to an upper end of the connection ring shaft frame 15, the sealing communication disc 13 is fixedly connected to an upper end of the protective pad ring frame 14, the electrical communication disc 12 is fixedly connected to an upper end of the sealing communication disc 13, the terahertz plate 11 is mounted at an upper end of the electrical communication disc 12, the terahertz plate 11 is in electrical communication with the electrical communication disc 12 to achieve a purpose of magnetization treatment, the sealing communication disc 13, the protective pad ring frame 14, the connection ring shaft frame 15, the cooperative adjustment shaft sleeve 16 and the driven fluted disc 17 are fixed, and the terahertz plate 11, the electrical communication disc 12, the sealing communication disc 13, the protective pad ring frame 14, the connection ring shaft frame 15 and the cooperative adjustment shaft sleeve 16 are driven integrally to cooperatively rotate by means of rotation of the driven fluted disc 17, so as to facilitate adjustment and achieve a purpose of multi-position magnetization treatment.

Figure 8:
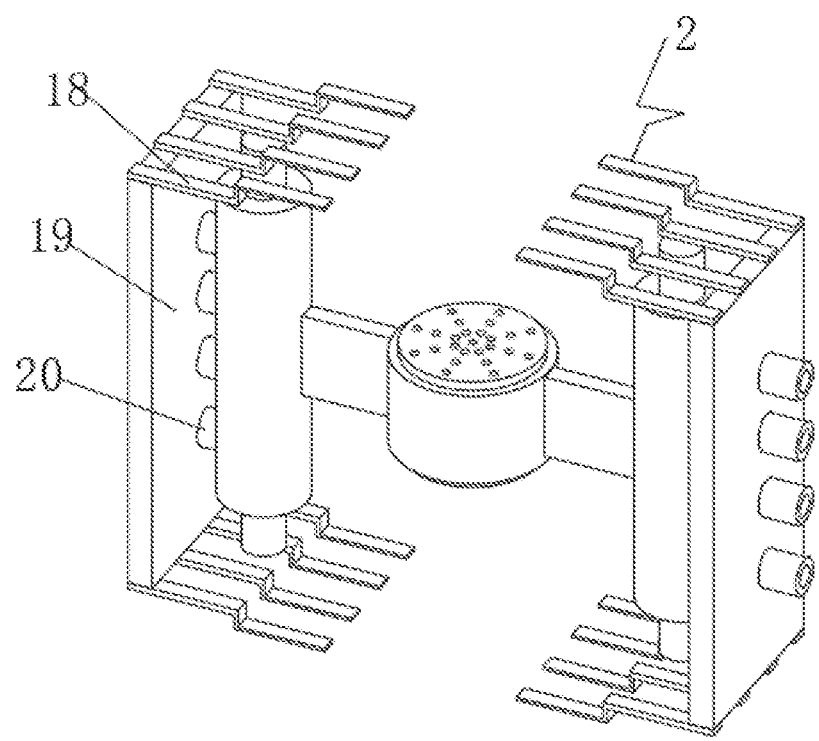
FIG. 8 is a schematic structural diagram of an electromagnetic production structure of the present invention.

With reference to FIG. 8, the electromagnetic production structure 2 includes a protective top frame 18, a mounting vertical plate frame 19 and a cooperative communication pipe 20; and the protective top frame 18 is arranged at a top of an inner end of the electromagnetic production structure 2, the mounting vertical plate frame 19 is fixedly connected to a lower end of the protective top frame 18, and the cooperative communication pipe 20 is fixedly connected to a centre of the mounting vertical plate frame 19.

Figure 9:
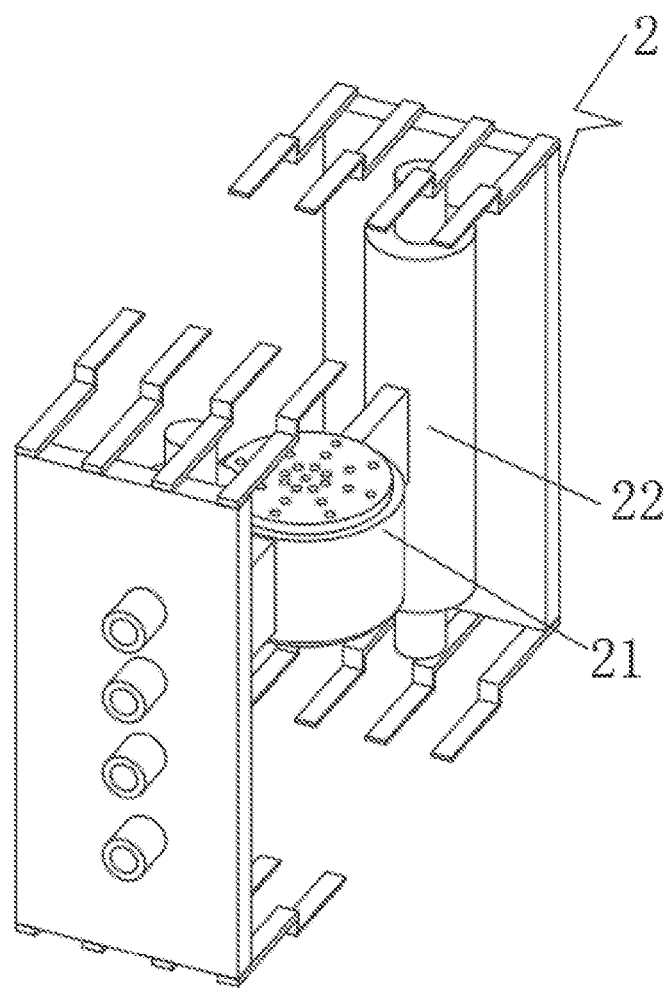
FIG. 9 is a side view of the electromagnetic production structure of the present invention.

With reference to FIG. 9, the electromagnetic production structure 2 further includes a producing and processing pipe 21 and a conduction and storage pipe 22, where the stable top plate frame 5 is fixedly connected to the protective top frame 18, the producing and processing pipe 21 and the conduction and storage pipe 22 are in communication with the outside by means of the cooperative communication pipe 20, the first electromagnetic generation mechanism 9 and the second electromagnetic generation mechanism 10 are symmetrically arranged and are connected to an upper end and a lower end of the producing and processing pipe 21 respectively, the first electromagnetic generation mechanism 9 and the second electromagnetic generation mechanism 10 at an inner end of the cooperative adjustment component 4 are in communication with the electromagnetic production structure 2 in a cooperative manner, and the producing and processing pipe 21 is made of stainless steel; and the conduction and storage pipe 22 is in communication with a side end of the cooperative communication pipe 20, and a side end of the conduction and storage pipe 22 is in communication with the electromagnetic production structure 2; and an upper end of the producing and processing pipe 21 is provided with a disc body, the disc body is rotatably and hermetically connected to the producing and processing pipe 21, and the terahertz plate 11 makes contact with the disc body in a limited manner.

A method for using the intelligent manufacturing system for terahertz water molecule rearrangement includes:

S1, a drive adjustment structure 1 and an electromagnetic production structure 2 are connected in a combined manner, and a first electromagnetic generation mechanism 9 and a second electromagnetic generation mechanism 10 are symmetrically combined with a producing and processing pipe 21 to supply water from the outside; and S2, a cooperative communication pipe 20 transfers water to the producing and processing pipe 21, in this case, an electrical communication disc 12 works to drive a terahertz plate 11 to operate, and the terahertz plate 11 achieves magnetization treatment work; and S3, a drive motor works to drive a drive fluted piece 7 to rotate to act on a driven fluted disc 17, so as to drive a cooperative adjustment shaft sleeve 16, a connection ring shaft frame 15, a protective pad ring frame 14, a sealing communication disc 13, the electrical communication disc 12 and the terahertz plate 11 to rotate, and the terahertz plate 11 rotates to drive a disc body at an upper end of the producing and processing pipe 21 to cooperatively rotate, so as to achieve multi-position and efficient magnetization treatment work.

Figure 11:
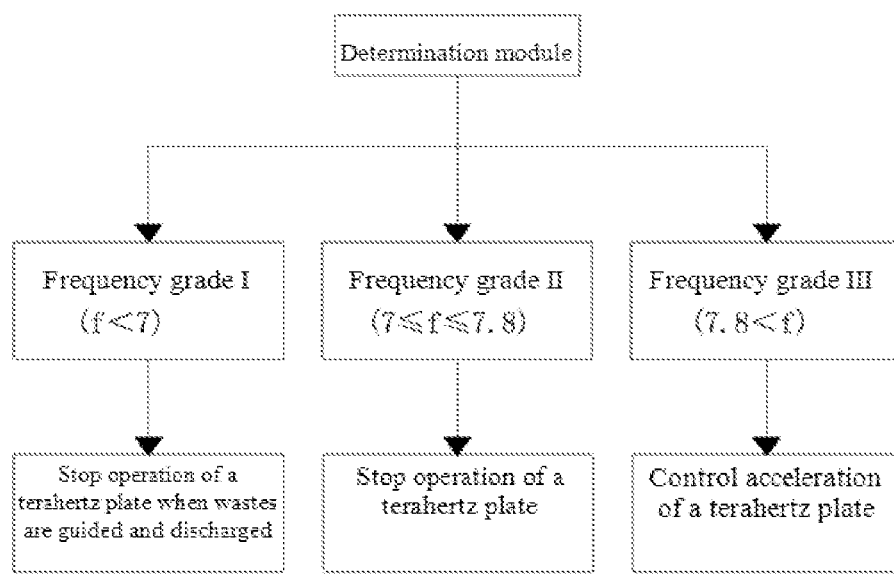
FIG. 11 is a module diagram of the main body of the present invention.

When the example is implemented, the stable connection component 3 helps to connect the side portion, so as to drive the cooperative adjustment component 4, and may drive the cooperative adjustment component 4 to be rotatably adjusted. The stable top plate frame 5 and the stable column plate 8 are fixed to achieve a support purpose. The supporting and connecting block seat 6 is fixed to a side end of the stable column plate 8 to achieve support and connection work. The drive fluted piece 7 is rotatable on the supporting and connecting block seat 6 to facilitate a cooperative drive function. The first electromagnetic generation mechanism 9 and the second electromagnetic generation mechanism 10 are symmetrically arranged to facilitate multi-position contact production work. The drive adjustment structure 1 is mounted, and contact between the drive adjustment structure and water is facilitated by means of structural arrangement of the drive adjustment structure 1, such that a purpose of internal magnetization treatment is achieved. Integrated production work may be achieved by means of combined arrangement of the drive adjustment structure 1 and the electromagnetic production structure 2, such that integrated production treatment work is facilitated. Moreover, multi-directional electromagnetic treatment work is facilitated by means of combined communication of the drive adjustment structure 1 and the electromagnetic production structure 2, such that a purpose of better magnetization treatment is achieved. The terahertz plate 11 is in electrical communication with the electrical communication disc 12, such that a purpose of magnetization treatment may be achieved. The sealing communication disc 13, the protective pad ring frame 14, the connection ring shaft frame 15, the cooperative adjustment shaft sleeve 16 and the driven fluted disc 17 are fixed, and the terahertz plate 11, the electrical communication disc 12, the sealing communication disc 13, the protective pad ring frame 14, the connection ring shaft frame 15, and the cooperative adjustment shaft sleeve 16 are driven integrally to cooperatively rotate by means of rotation of the driven fluted disc 17, so as to facilitate adjustment and achieve a purpose of multi-position magnetization treatment. The protective top frame 18 is fixed to the mounting vertical plate frame 19, such that support work of the cooperative communication pipe 20 at the centre may be achieved to facilitate communication with the outside, so as to achieve efficient and automated water supply. The cooperative communication pipe 20 is in communication with the producing and processing pipe 21 and the conduction and storage pipe 22, so as to facilitate guiding and discharging treatment and better perform cooperative production work. As shown in FIG. 11, a monitoring task may be carried out by means of an internal detection device, so as to analyze a frequency of water and treat water having different frequencies separately.

Example 2

Figure 10:
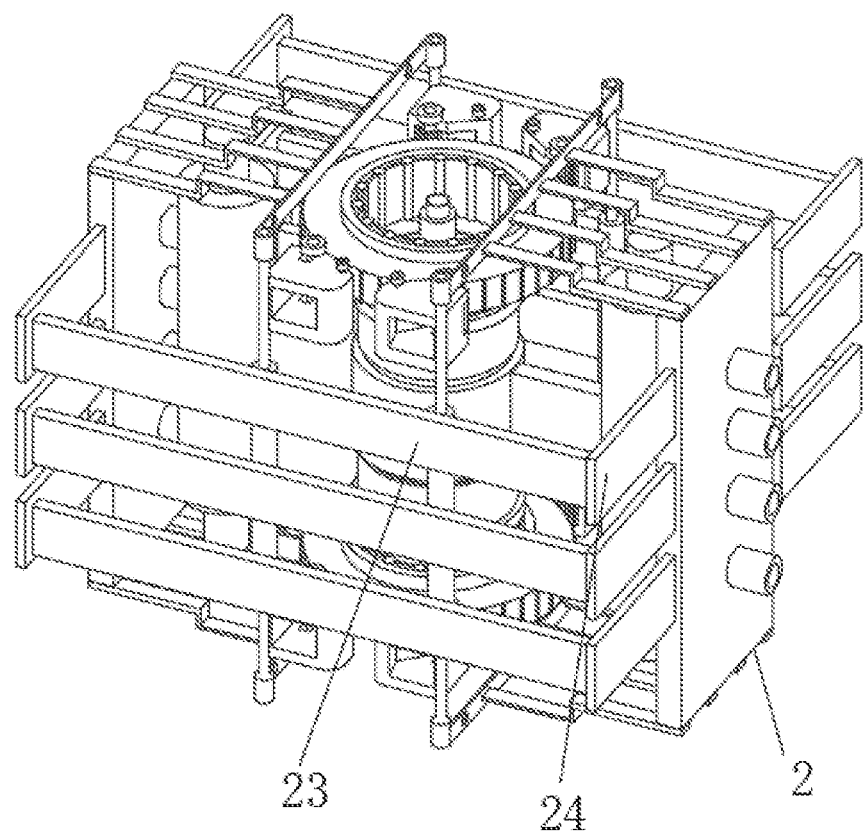
FIG. 10 is a schematic structural diagram of Example II of a main body of the present invention.

On the basis of Example 1, as shown in FIG. 10, a locating and limiting guide frame 24 is fixedly connected to a front end of an electromagnetic production structure 2, and a lateral protective support 23 is fixedly connected to a front end of the locating and limiting guide frame 24.

When the example is implemented, the lateral protective support 23 and the locating and limiting guide frame 24 are mounted, and the lateral protective support 23 and the locating and limiting guide frame 24 are fixedly connected to each other, such that a purpose of protecting the side portion of the electromagnetic production structure 2 is achieved, and a purpose of better protecting inner end components of the drive adjustment structure 1 and the electromagnetic production structure 2 is achieved by helping to perform internal and external separation work by means of multi-directional protection work of the drive adjustment structure 1 and the electromagnetic production structure 2, thereby improving an integrated cooperative production capacity.

A working principle is as follows: the drive adjustment structure 1 and the electromagnetic production structure 2 are combined, and the drive adjustment structure 1 is arranged by means of a combination of a stable connection component 3 and a cooperative adjustment component 4. The stable connection component 3 helps to connect a side portion to achieve a driving purpose of the cooperative adjustment component 4, and may drive the cooperative adjustment component 4 to be rotatably adjusted. The stable connection component 3 is arranged by means of a combination of a stable top plate frame 5, a supporting and connecting block seat 6, a driving fluted piece 7 and a stable column plate 8, and the stable top plate frame 5 is fixed to the stable column plate 8, so as to achieve a support purpose. The supporting and connecting block seat 6 is fixed to a side end of the stable column plate 8, so as to achieve support and connection work. The drive fluted piece 7 is rotatable on the supporting and connecting block seat 6, so as to facilitate a cooperative drive function. The cooperative adjustment component 4 is arranged by means of a combination of a first electromagnetic generation mechanism 9 and a second electromagnetic generation mechanism 10, such that the first electromagnetic generation mechanism 9 and the second electromagnetic generation mechanism 10 are symmetrically arranged to facilitate multi-position contact production work. The second electromagnetic generation mechanism 10 is connected by means of a combination of a terahertz plate 11, an electrical communication disc 12, a sealing communication disc 13, a protective pad ring frame 14, a connection ring shaft frame 15, a cooperative adjustment shaft sleeve 16 and a driven fluted disc 17, such that the terahertz plate 11 is in electrical communication with the electrical communication disc 12, and a purpose of magnetization treatment may be achieved. The sealing communication disc 13, the protective pad ring frame 14, the connection ring shaft frame 15, the cooperative adjustment shaft sleeve 16, and the driven fluted disc 17 are fixed. The terahertz plate 11, the electrical communication disc 12, the sealing communication disc 13, the protective pad ring frame 14, the connection ring shaft frame 15 and the cooperative adjustment shaft sleeve 16 are driven integrally to cooperatively rotate by means of rotation of the driven fluted disc 17, so as to facilitate adjustment and achieve a purpose of multi-position magnetization treatment. The electromagnetic production structure 2 is connected by means of a combination of a protective top frame 18, a mounting vertical plate frame 19 and a cooperative communication pipe 20, such that the protective top frame 18 and the mounting vertical plate frame 19 are fixed, and support work of the cooperative communication pipe 20 at the centre may be achieved to facilitate communication between the cooperative communication pipe and the outside, so as to achieve efficient and automated water supply. The cooperative communication pipe 20 is in communication with a producing and processing pipe 21 and a conduction and storage pipe 22, so as to facilitate guiding and discharging treatment and better perform cooperative production work. When a user needs to perform treatment, the drive adjustment structure 1 is connected to the electromagnetic production structure 2 in a combined manner, and the first electromagnetic generation mechanism 9 and the second electromagnetic generation mechanism 10 are symmetrically combined with the producing and processing pipe 21. Water is supplied from the outside, and is transferred to the producing and processing pipe 21 by the cooperative communication pipe 20. In this case, the electrical communication disc 12 works to drive the terahertz plate 11 to operate, and the terahertz plate 11 achieves magnetization treatment work. Then, a drive motor works to drive the drive fluted piece 7 to rotate to act on the driven fluted disc 17, so as to drive the cooperative adjustment shaft sleeve 16, the connection ring shaft frame 15, the protective pad ring frame 14, the sealing communication disc 13, the electrical communication disc 12, and the terahertz plate 11 to rotate. The terahertz plate 11 rotates to drive a disc body at an upper end of the producing and processing pipe 21 to cooperatively rotate, so as to achieve multi-position and efficient magnetization treatment work and complete work.

Although the examples of the present invention have been illustrated and described, it should be understood that those of ordinary skill in the art can make various changes, modifications, replacements and variations to these examples without departing from the principle and spirit of the present invention, and the scope of the present invention is limited by the appended claims and equivalents of the appended claims.

What is claimed is:

1. An manufacturing system for terahertz water molecule rearrangement, comprising: a drive adjustment structure (1) and an electromagnetic production structure (2), wherein the electromagnetic production structure (2) is fixedly connected to a centre of the drive adjustment structure (1); the drive adjustment structure (1) comprises a fixing connection component (3) and a cooperative adjustment component (4), wherein the cooperative adjustment component (4) is arranged at a centre of an inner end of the drive adjustment structure (1), a side end of the cooperative adjustment component (4) meshes with the fixing connection component (3), and the fixing connection component (3) is configured to perform lateral connection; the fixing connection component comprises a fixing top plate frame, a supporting and connecting block seat, a drive fluted piece and a fixing column plate, wherein a driven fluted disc meshes with the drive fluted piece, an upper end of the drive fluted piece is provided with a drive motor, the drive motor drives the drive fluted piece to be rotatably connected to the supporting and connecting block seat, the fixing top plate frame is arranged at a top of an inner end of the fixing connection component, the fixing column plate is fixedly connected to a lower end of the fixing top plate frame, the supporting and connecting block seat is fixedly connected to a side portion of the fixing column plate, the drive fluted piece is rotatably connected to a centre of the supporting and connecting block seat, the supporting and connecting block seat is fixed to a side end of the fixing column plate, and the drive fluted piece is rotatable on the supporting and connecting block seat; the cooperative adjustment component comprises a first electromagnetic generation mechanism and a second electromagnetic generation mechanism, wherein the first electromagnetic generation mechanism is arranged at a top of an inner end of the cooperative adjustment component, and the second electromagnetic generation mechanism and the first electromagnetic generation mechanism are symmetrically arranged; the second electromagnetic generation mechanism comprises a terahertz plate, an electrical communication disc, a sealing communication disc, a protective pad ring frame, a connection ring shaft frame, a cooperative adjustment shaft sleeve and the driven fluted disc, wherein a plurality of terahertz plates are arranged, and are all fixedly connected to an upper end of the electrical communication disc, each of the plurality of terahertz plates is in electrical communication with the outside by way of the electrical communication disc, the driven fluted disc drives the plurality of terahertz plates to be rotatably connected by way of the cooperative adjustment shaft sleeve, the connection ring shaft frame, the protective pad ring frame, the sealing communication disc and the electrical communication disc, the driven fluted disc is arranged at a bottom of an inner end of the second electromagnetic generation mechanism, the cooperative adjustment shaft sleeve is fixedly connected to an upper end of the driven fluted disc, the connection ring shaft frame is fixedly connected to an upper end of the cooperative adjustment shaft sleeve, the protective pad ring frame is fixedly connected to an upper end of the connection ring shaft frame, the sealing communication disc is fixedly connected to an upper end of the protective pad ring frame, the electrical communication disc is fixedly connected to an upper end of the sealing communication disc, each of the plurality of terahertz plates is mounted at an upper end of the electrical communication disc, each of the plurality of terahertz plates is in electrical communication with the electrical communication disc, wherein the sealing communication disc, the protective pad ring frame, the connection ring shaft frame, the cooperative adjustment shaft sleeve and the driven fluted disc are fixed, and the plurality of terahertz plates, the electrical communication disc, the sealing communication disc, the protective pad ring frame, the connection ring shaft frame and the cooperative adjustment shaft sleeve are driven integrally to cooperatively rotate by way of rotation of the driven fluted disc; and the electromagnetic production structure further comprises a producing and processing pipe and a conduction and storage pipe, wherein the fixing top plate frame is fixedly connected to a protective top frame, the producing and processing pipe and the conduction and storage pipe are in communication with the outside by fixing of a cooperative communication pipe, the first electromagnetic generation mechanism and the second electromagnetic generation mechanism are symmetrically arranged and are connected to an upper end and a lower end of the producing and processing pipe respectively, wherein the first electromagnetic generation mechanism and the second electromagnetic generation mechanism are at an inner end of the cooperative adjustment component and are in communication with the electromagnetic production structure, the producing and processing pipe is made of stainless steel, the conduction and storage pipe is in communication with a side end of the cooperative communication pipe, a side end of the conduction and storage pipe is in communication with the electromagnetic production structure, an upper end of the producing and processing pipe is provided with a disc body, the disc body is rotatably and hermetically connected to the producing and processing pipe, and each of the plurality of terahertz plates makes contact with the disc body in a position-defined manner.

* * * * *